(12) United States Patent
Saeki et al.

(10) Patent No.: US 8,584,783 B2
(45) Date of Patent: Nov. 19, 2013

(54) MOTORCYCLE WITH SUPERCHARGER

(75) Inventors: Daisuke Saeki, Kakogawa (JP); Kazuo Tanaka, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/531,361

(22) Filed: Jun. 22, 2012

(65) Prior Publication Data

US 2012/0267182 A1    Oct. 25, 2012

Related U.S. Application Data

(63) Continuation of application No. PCT/JP2010/071118, filed on Nov. 26, 2010.

(30) Foreign Application Priority Data

Dec. 24, 2009   (JP) .................... 2009-292060

(51) Int. Cl.
*B62M 27/02*   (2006.01)

(52) U.S. Cl.
USPC ........................................... 180/219

(58) Field of Classification Search
USPC ........................................... 180/219
See application file for complete search history.

(56) References Cited

U.S. PATENT DOCUMENTS

| | | | |
|---|---|---|---|
| 4,427,087 A * | 1/1984 | Inoue et al. | 180/219 |
| 4,475,617 A * | 10/1984 | Minami et al. | 180/219 |
| 4,550,794 A * | 11/1985 | Inoue et al. | 180/219 |
| 4,735,178 A * | 4/1988 | Inoue et al. | 180/219 |
| 5,263,463 A | 11/1993 | Perry | |
| 5,421,296 A * | 6/1995 | Hitomi et al. | 123/184.53 |
| 7,051,824 B1 | 5/2006 | Jones et al. | |
| 2007/0102215 A1* | 5/2007 | Pichler et al. | 180/190 |

FOREIGN PATENT DOCUMENTS

| | | |
|---|---|---|
| CN | 1924323 | 7/2007 |
| JP | 02-006289 | 1/1990 |
| JP | 02-024282 | 1/1990 |
| JP | 02-163539 | 6/1990 |
| JP | 06-108858 | 4/1994 |

OTHER PUBLICATIONS

PCT Application No. PCT/JP2010/071118 International Preliminary Report on Patentability, dated Aug. 14, 2012, 8 pages.
Chinese Patent Application No. 201080058157.X Office Action dated Jun. 7, 2013, 13 pages including partial English translation.
European Patent Application No. 10839133.5 European Extended Search Report dated May 24, 2013, 6 pages.
PCT Application No. PCT/JP2010/071118 International Preliminary Report on Patentability, dated Aug. 12, 2012, 8 pages.

* cited by examiner

*Primary Examiner* — Kevin Hurley
*Assistant Examiner* — Michael Stabley

(57) ABSTRACT

A motorcycle includes a combustion engine (E) of a type, in which a cylinder block (34) protrudes upwardly from a crankcase (32), an air cleaner unit (42) for substantially purifying an air, and a supercharger (44) for taking a substantially purified air from the air cleaner unit (42) thereinto and supplying the air towards the combustion engine (E). The supercharger (44) is disposed rearwardly of the cylinder block (34) and the air cleaner unit (42) is disposed rearwardly thereof. Also, a surge tank (48) is disposed rearwardly upwardly of the cylinder block (34) of the combustion engine (E) and above the supercharger (44).

16 Claims, 3 Drawing Sheets

MOTORCYCLE WITH SUPERCHARGER

CROSS REFERENCE TO THE RELATED APPLICATION

This application is a continuation application, under 35 U.S.C. §111(a) of international application No. PCT/JP2010/071118, filed Nov. 26, 2010, which claims priority to Japanese patent application No. 2009-292060, filed Dec. 24, 2009, the entire disclosure of which is herein incorporated by reference as a part of this application.

BACKGROUND OF THE INVENTION

1. Field of the Invention

The present invention relates to a motorcycle and, more particularly, to a motorcycle having built therein a supercharger for pressurizing an intake air to be forcibly pushed into a combustion engine.

2. Description of Related Art

Some of the supercharger mounted motorcycles currently available in the market has an air cleaner unit mounted above a cylinder block of a motorcycle combustion engine and a supercharger positioned rearwardly of the cylinder block with respect to the direction of forward travel of the motorcycle (see the patent document 1 listed below).

PRIOR ART LITERATURE

[Patent Document 1] JP Laid-open Patent Publication No. 02-163539

It has, however, been found that the system disclosed in the patent document 1 listed above requires a relatively long ducting or piping to fluidly connect the air cleaner unit to the supercharger and does therefore make great demands on the space around the motorcycle combustion engine along with an increase of the number of component parts required.

SUMMARY OF THE INVENTION

The present invention is therefore devised to substantially eliminate the above discussed problems and inconveniences inherent in the prior art supercharger mounted motorcycle of the kind referred to above and is intended to provide an improved supercharger mounted motorcycle in which the space around the motorcycle combustion engine can be saved and also the number of component parts required can be reduced.

In order to accomplish the foregoing object, the present invention provides a two-wheeled motor vehicle or a motorcycle having a supercharger mounted thereon, which vehicle includes a combustion engine having a cylinder block protruding upwardly from a crankcase, an air cleaner unit for substantially purifying an air, and a supercharger for taking a substantially purified air from the air cleaner unit thereinto and supplying the air towards the combustion engine. In this motorcycle, the supercharger and the air cleaner unit are disposed rearwardly of the cylinder block.

It is to be noted that the wording "disposed rearwardly of the cylinder block" referred to above and below is intended to mean that a major portion (more than half) or the whole of an instrument to be disposed exists rearwardly of the cylinder block when viewed from one side of the motorcycle body. Also, it is preferred that one or more of the following conditions (a) to (c) be satisfied.

(a) The position of the instrument in its entirety in a forward and rearward direction is defined rearwardly of the cylinder block.

(b) The position of a major portion or the whole of the instrument in a vertical direction exists intermediate between an upper end edge and a lower end edge of the cylinder block.

(c) The position of a major portion or the whole of the instrument in a leftward and rightward direction exists intermediate between left and right (width wise) end edges of the cylinder block.

According to the structure, since the supercharger and the air cleaner unit are disposed rearwardly of the cylinder block and, hence, the both can be connected directly with each other, the use of any intermediate piping can be dispensed with and the space around the combustion engine is therefore saved and the number of component parts can be reduced, thus simplifying the structure.

In another preferred embodiment of the present invention, the air cleaner unit may be disposed rearwardly of the supercharger. The disposition of the air cleaner unit in this way is effective to realize the shortest possible intake passage extending from the air cleaner unit to the combustion engine by way of the supercharger at a location rearwardly of the combustion engine. Also, since the supercharger intervenes between the air cleaner unit and the combustion engine with the air cleaner unit accordingly spaced a distance from the combustion engine, an air of a relatively low temperature, which is substantially free from thermal influences brought about by heat radiation from the combustion engine, can be introduced into the air cleaner unit, resulting in an increase of the air intake efficiency.

In the construction in which the air cleaner unit is disposed rearwardly of the supercharger, a surge tank may be disposed rearwardly upwardly of the cylinder block of the combustion engine and above the supercharger.

In the conventional structure in which the air cleaner unit is disposed above the combustion engine, an intermediate pipe for fluidly connecting between the air cleaner unit and the supercharger is disposed rearwardly upwardly of the combustion engine and, therefore, it has been difficult for a surge tank to have a sufficient capacity. In contrast thereto, the positioning of the surge tank at a location rearwardly upwardly of the cylinder block is effective to secure a sufficient space at a site rearwardly upwardly of the combustion engine and, therefore, the surge tank disposed at that position can have an increased capacity.

In the structure in which the air cleaner unit is disposed rearwardly of the combustion engine, a fuel tank is preferably disposed above the combustion engine, the supercharger and the air cleaner unit. According to the positioning of the fuel tank in this way, since the air cleaner unit hitherto disposed above the combustion engine is disposed rearwardly of the supercharger, the space above the combustion engine can be secured in a quantity corresponding to a space required to accommodate the air cleaner unit and an intermediate pipe between the air cleaner and the supercharger and, therefore, the fuel tank can have an increased capacity.

In the structure in which the air cleaner unit is disposed rearwardly of the combustion engine, an air control valve unit for adjusting an amount of the air to be supplied to the supercharger may be disposed intermediate between the supercharger and the air cleaner unit. In this case, at least a portion of the air control valve unit, when viewed from side, is preferably so disposed as to overlap the supercharger.

According to the structural features described above, since the air cleaner unit, the air control valve unit and the supercharger are disposed rearwardly of the cylinder block, the space can be secured above the combustion engine while a supercharging pressure of the supercharger is adjusted by the air control valve unit. In particular, when viewed from side of the motorcycle body, the positioning of at least a portion of the air control valve unit referred to above so as to overlap the supercharger is effective to allow the supercharger and the air control valve unit to be disposed by the effective utilization of the space available between the cylinder block and the air cleaner unit and, therefore, the space around the combustion engine can be further saved.

Where the air cleaner unit is disposed rearwardly of the supercharger as hereinabove described, the air cleaner unit is preferably disposed above a crossbar in a main frame of a motorcycle body. According to this structural feature, the air cleaner unit is disposed within the space available above the crossbar and, therefore, the capacity of the air cleaner unit can be increased.

In another preferred embodiment of the present invention, the air cleaner unit preferably has an intake opening, which opens towards one lateral side of a motorcycle body, in which case the supercharger has a suction port directed towards the opposite lateral side of the motorcycle body. According to this structural feature, after the air drawn from one lateral side of the motorcycle body into the air cleaner, after having been substantially purified in the air cleaner unit, comes out of the opposite lateral side of the motorcycle body and does then flow into the suction port of the supercharger, which is directed or opens towards the opposite lateral side of the motorcycle body. Accordingly, the air passage extending from the air cleaner unit to the supercharger is reduced in length and the flow loss can therefore be suppressed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described with reference to the accompanying drawings.

Figure 1:
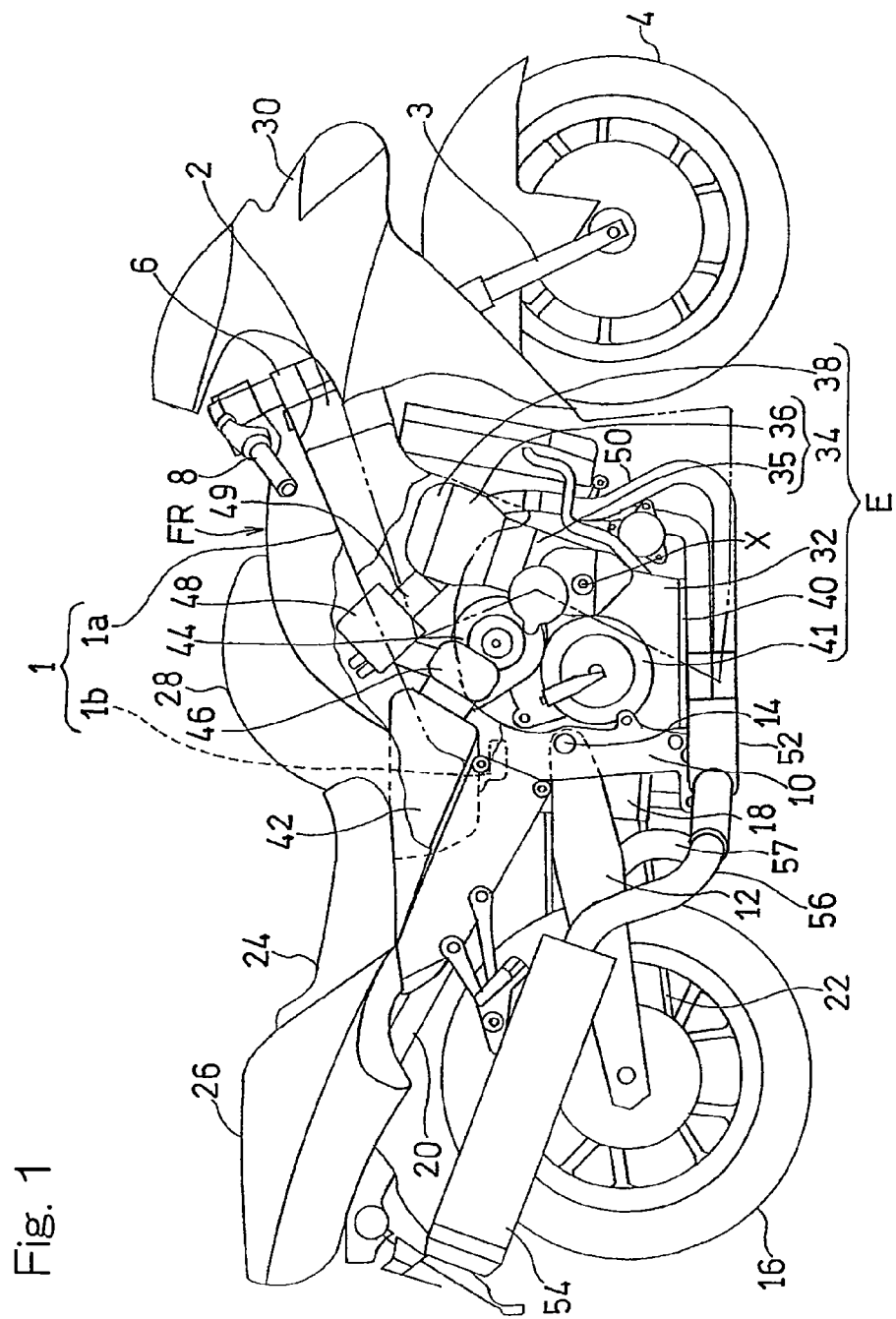
FIG. 1 is a side view showing a supercharger mounted motorcycle designed in accordance with a preferred embodiment of the present invention.

In particular, FIG. 1 is a side view showing a supercharger mounted motorcycle designed in accordance with the preferred embodiment of the present invention. The motorcycle shown therein includes a motorcycle frame structure FR made up of a front frame section and a rear frame section. A front fork assembly 3 is supported by a head block 2, which is in turn supported by a front portion of a rearwardly downwardly extending main frame 1 forming a part of the front frame section, with a front wheel 4 rotatably supported by a lower end of the front fork assembly 3. Also, an upper bracket 6 to support an upper end portion of the front fork assembly 3 has a handlebar 8 mounted thereon. The main frame 1 referred to above has a lower rear end portion to which a swingarm bracket 10 is secured, and a swingarm 12 has its front end pivotally connected with the swing arm bracket 10 for vertical movement. A rear wheel 16 is rotatably supported by a rear end portion of the swingarm 12.

The main frame 1 has a pair of left and right frame pieces 1a and 1a connected with each other by means of a crossbar 1b that is fixed to an upper rear end portion of such main frame 1, which portion lies in the vicinity of a generally intermediate portion of a motorcycle body with respect to the direction of forward travel of the motorcycle, and extends in a direction substantially widthwise of the motorcycle body. A known rear suspension unit 18 for the rear wheel 16 is interposed between the crossbar 1b and the swingarm 12. The main frame 1 has a rear portion provided with a seat rail assembly 20 rigidly connected therewith so as to extend therefrom in a direction rearwardly and upwardly of the motorcycle body, which rail assembly 20 forms a part of the rear frame section of the motorcycle frame structure FR. A combustion engine E is mounted on a lower intermediate portion of the main frame 1 and drivingly connected with the rear wheel 16 through a drive transmitting mechanism 22 such as, for example, an endless chain disposed on a one side, for example, a left side of the motorcycle body.

The seat rail assembly 20 has a motorcycle rider's seat 24 and a fellow passenger's seat 26 supported thereon, and a fuel tank 28 is mounted on an upper portion of the main frame 1 generally intermediate between the handlebar 8 and the rider's seat 24. Also, a front portion of the motorcycle body has a fairing 30 mounted thereon, which fairing 30 is made of, for example, a synthetic resin and is so shaped as to enclose a forward area of the handlebar 8 and left and right front side areas of the motorcycle body, with left and right rear side areas thereof covering left and right side and lower end areas of the combustion engine E.

The combustion engine E so far shown in connection with the preferred embodiment is employed in the form of a parallel multicylinder combustion engine, for example, a parallel four cylinder, four-stroke cycle combustion engine and includes a crankcase 32, a cylinder block 34 having cylinders 35, protruding upwardly from the crankcase 32, and cylinder heads 36 mounted atop the respective cylinders 35, a cylinder head cover 38 enclosing upper portions of the cylinder heads 36, an oil pan 40 disposed below the crankcase 32, and a transmission casing 41 forming a rear portion of the crankcase 32. The cylinder heads 36 are somewhat tilted forwards and, in the instance as shown, the cylinder heads 36 have respective longitudinal axes inclined at an angle of about 65° relative to the horizontal datum generally parallel to the road surface.

Four exhaust pipes 50 extending outwardly from front portions of the associated cylinder heads 36 are merged together at a collecting region 52, positioned below the combustion engine E. The collecting region 52 has a downstream end portion fluidly connected with left and right exhaust mufflers 54, positioned on the left and right side of the rear wheel 16, through respective connecting pipes 56 and 57.

An air cleaner unit 42 for substantially purifying an air to be introduced into the combustion engine E as will be detailed later is positioned rearwardly of the cylinder block 34 and above the crossbar 1b of the main frame 1. A supercharger 44 for supplying the air, which has been substantially purified as it flows through the air cleaner unit 42, to the combustion engine E is positioned rearwardly of the cylinder block 34 and forwardly of the air cleaner unit 42. The fuel tank 28 is positioned above the air cleaner unit 42 and the supercharger 44. An air control valve unit 46 for adjusting an amount of the substantially purified air to be supplied to the supercharger 44 is positioned and fluidly connected between the air cleaner unit 42 and the supercharger 44.

A surge tank 48 for accumulating a pressurized air to be forcibly pushed from the supercharger 44 into the combustion engine E is positioned rearwardly upwardly of the cylinder block 34 of the combustion engine E and substantially intermediate between the supercharger 44 and the fuel tank 28, that is, upwardly of the supercharger 44 and downwardly of the fuel tank 28. A throttle body 49 is disposed generally intermediate between the surge tank 48 and the cylinder heads 36 and, therefore, a fuel is injected into the intake air within the throttle body 49 to form an air/fuel mixture to be supplied to the combustion engine E.

Figure 2:
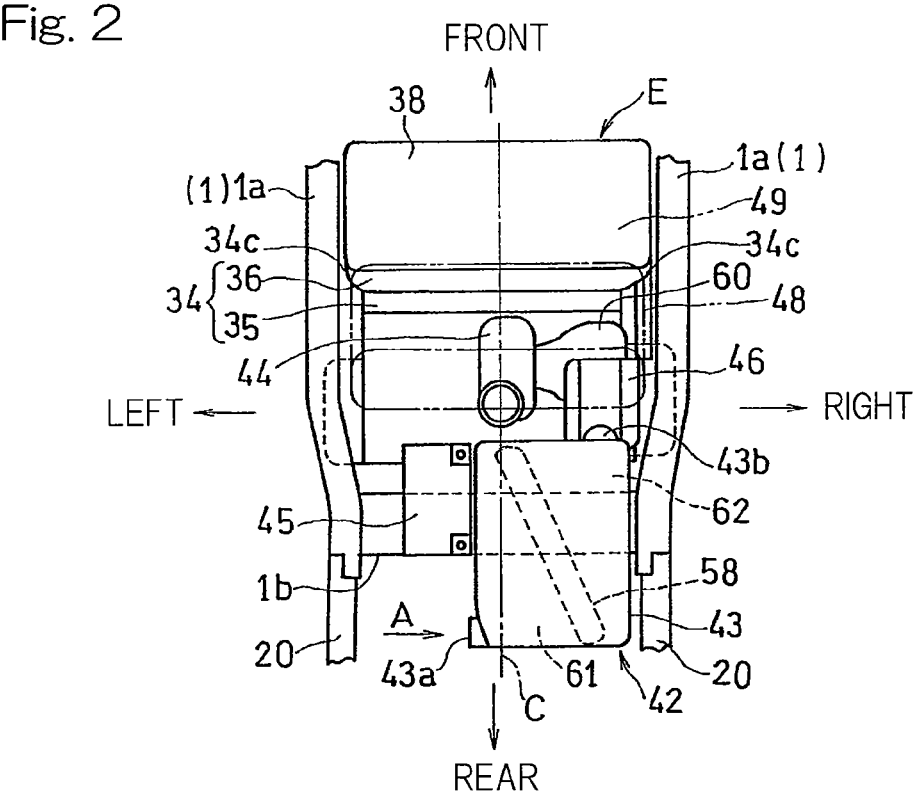
FIG. 2 is a top plan view showing a motorcycle combustion engine and its surroundings in the supercharger mounted motorcycle.

Referring to FIG. 2, the air cleaner unit 42 is interposed between the left and right frame pieces 1a and 1a of the main frame 1 and has a width enough to extend generally from a position somewhat left side with respect to a longitudinal center line C of the motorcycle body to a position proximity to an inside of the right frame piece 1a, with a cleaner casing 43 thereof secured to and supported by the main frame 1 by means of suitable fastening members (not shown) such as, for example, bolts. The cleaner casing 43 has its interior accommodating therein a cleaner element 58 which extends in a direction generally parallel to the longitudinal axis of the motorcycle body. The cleaner casing 43 has its rear portion formed with an intake opening 43a opening towards one lateral side of the motorcycle body, that is, in a direction leftwards of the motorcycle body and also has a front portion formed with an outlet opening 43b positioned on the opposite lateral side of the cleaner casing 43, that is, on the right side of the cleaner casing 43 and opening forwards of the motorcycle body.

The air cleaner unit 42 of the type described above is so designed and so configured that an air A can be introduced from an air intake opening 43a on the left side of the motorcycle body into a dirty area 61, which is an upstream side of the cleaner element 58, and, after the air A so introduced has been substantially purified by the cleaner element 58 to provide a substantially purified air in a clean area 62 which is a downstream side of the cleaner element 58, such substantially purified air can be supplied from the clean area 62 to the air control valve unit 46 through the outlet opening 43b.

Figure 3:
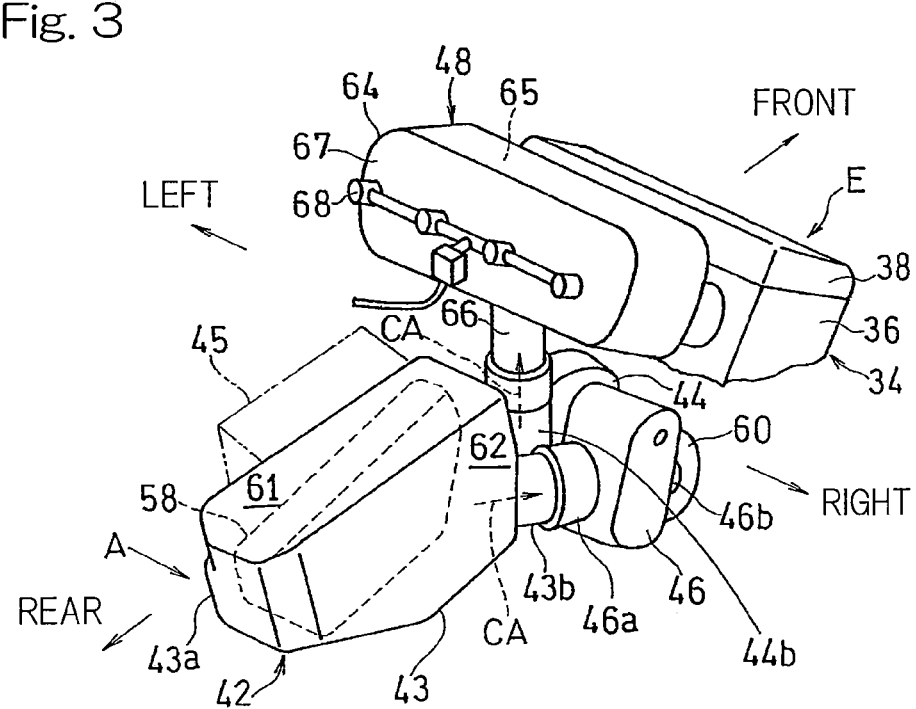
FIG. 3 is a perspective view showing an engine intake system of the supercharger mounted motorcycle as viewed in a direction diagonally downwardly from a right side of the supercharger mounted motorcycle.

The outlet opening 43b of the air cleaner unit 42 is, as best shown in FIG. 3, inclined forwardly downwardly so as to open towards the air control valve unit 46. In other words, the air cleaner unit 42, after it has substantially purified the air A introduced from the left side of the motorcycle body, feeds the substantially purified air from the right side of the motorcycle body in a direction forwardly of the motorcycle body with respect to the direction of forward travel of the motorcycle. A rear intake opening 46a of the air control valve unit 46 is fluidly connected with this outlet opening 43b of the air cleaner unit 42.

Figure 4:
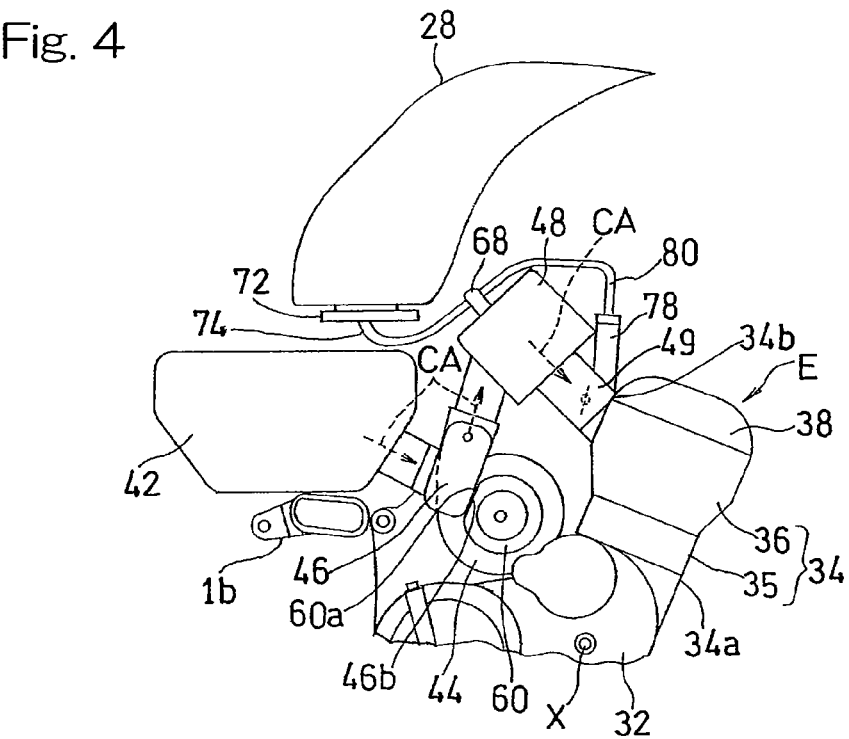
FIG. 4 is a right side view showing, on an enlarged scale, an important portion of the supercharger mounted motorcycle shown in FIG. 1.

As best shown in FIG. 2, on the left side of the air cleaner unit 42, a battery 45 supported by the crossbar 1b is positioned. The air control valve unit 46 is positioned at a location forwardly of the air cleaner unit 42 and on the right side of the center line C of the motorcycle body, an intake duct 60 is positioned forwardly of the air control valve unit 46 and the supercharger 44 is positioned on the left side of the intake duct 60. Accordingly, when viewed from side or laterally of the motorcycle body, the air control valve unit 46 is partly overlapped with a rear portion of the supercharger 44. It is, however, to be noted that the air control valve unit 46 may be so positioned as to be overlapped in its entirety when viewed from side. The supercharger 44 is positioned substantially on the center line C. The air control valve unit 46, the intake duct 60 and the supercharger 44 are supported by the combustion engine E by means of suitable fastening member (not shown) such as, for example, bolts. The air control valve unit 46 employed in the practice of the preferred embodiment has a butterfly valve having a valve shaft extending horizontally in a leftward and rightward direction, but the air control valve unit 46 may not be necessarily limited thereto. The air control valve unit 46 has a valve outlet opening 46b inclined forwardly downwardly (as shown in FIG. 4).

Figure 5:
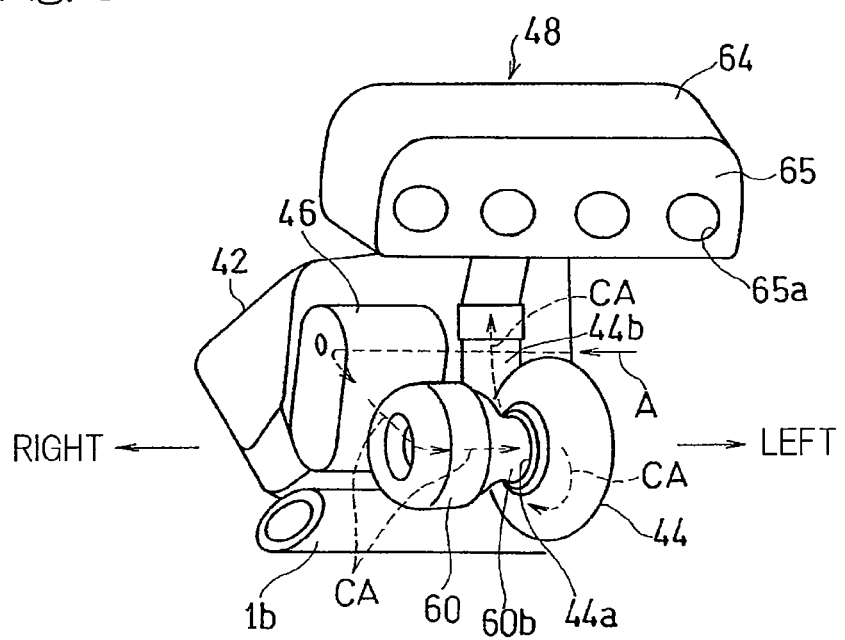
FIG. 5 is a perspective view showing the intake system of the supercharger mounted motorcycle as viewed in a direction diagonally upwardly from the right side of the supercharger mounted motorcycle.

The air control valve unit 46 and the supercharger 44 are fluidly connected with each other through the intake duct 60. As best shown in FIG. 4, the intake duct 60 has a duct inlet 60a fluidly connected with the valve outlet opening 46b of the air control valve unit 46, which is so inclined as to be oriented forwardly downwardly, and also has a duct outlet 60b fluidly connected with a suction port 44a open at a rear right side of the supercharger 44 as shown in FIG. 5. In other words, the intake duct 60 is so designed and so configured as to allow the air introduced from rear to be deflected an angle of 90° before it flows out towards the left side. In this way, the air control valve unit 46 is positioned forwardly downwardly of the air cleaner unit 42 shown in FIG. 4, the intake duct 60 is positioned forwardly downwardly of the air control valve unit 46, the supercharger 44 is positioned laterally of the intake duct 60 at the same height, and the surge tank 48 is positioned immediately above the supercharger 44. Accordingly, the intake system extending from the air cleaner unit 42 to the surge tank 48 has its length, as measured in the forward and rearward direction, that is thus reduced.

The air cleaner unit 42, the air control valve unit 46, the intake duct 60 and the supercharger 44 are positioned above a lower end edge (a lower portion front end edge) 34a of the cylinder block 34, the air cleaner unit 42 has its major portion positioned below an upper end edge (an upper portion rear end edge) 34b of the cylinder block 34, the air control valve unit 46 and the supercharger 44 in total are positioned below the upper end edge 34b of the cylinder block 34, and a substantially entirety of the surge tank 48 is positioned above the upper end edger 34b of the cylinder block 34.

Also, as shown in FIG. 2, the air cleaner unit 42, the air control valve unit 46, the intake duct 60 and the supercharger 44 are positioned intermediate between left and right end edges 34c and 34c of the cylinder block 34 without being protruding in respective directions leftwardly and rightwardly outwards from the cylinder block 34. Accordingly, the intake system can be made compact. It is, however, to be noted that the air cleaner unit 42, the air control valve unit 46, the intake duct 60 and the supercharger 44 may partially protrude laterally outwardly from the cylinder block 34, provided that respective major portions thereof will not protrude in the respective directions leftwardly and rightwardly outwards from the cylinder block 34.

The supercharger 44 has an axis lying parallel to a horizontally extending rotary shaft X (crankshaft) of the combustion engine E and is driven while having been drivingly connected with the rotary shaft X of the combustion engine E through the chain or a train of gears. The supercharger 44 also has the previously described suction port 44a, opening rightwards as shown in FIG. 5, and a discharge port 44b opening upwardly as shown in FIG. 5. In other words, the supercharger 44 discharges the air, which has been introduced from a right side, in a direction upwardly after such air has been deflected the angle of 90°.

The surge tank 48 is positioned above the supercharger 44 and, as FIG. 3 makes it clear, includes a transversely elongated, substantially rectangular tank body 64 of a width substantially equal to that of a set of the cylinder heads 36 and a tubular tank inlet portion 66 extending downwardly from the tank body 64. The tank inlet portion 66 is formed integrally with a widthwise intermediate portion of the tank body 64 and is fluidly connected with the discharge port 44b of the supercharger 44. A bottom surface 65 of the tank body 64 confronting the cylinder heads 36 as shown in FIG. 5 is formed with four openings 65a arranged in a row extending in the widthwise direction of the motorcycle body or in a direction lengthwise of the rectangular tank body 64, and the substantially purified air is introduced through those openings 65a into respective intake passages (not shown) of the throttle body 49 shown in FIG. 4.

As best shown in FIG. 3, the tank body 64 has a top surface 67 provided with four top injectors 68 so as to confront the associated openings 65a (best shown in FIG. 5). As shown in FIG. 4, a fuel pump 72 disposed at a lower end portion of the fuel tank 28 and the top injectors 68 are fluidly connected with a first fuel tube 74, which is in turn fluidly connected with a main injector 78 of the throttle body 49 by way of a second fuel tube 80 which is ramified from the first fuel tube 74.

In the embodiment described hereinabove, the air A is drawn into the air cleaner unit 42 through the inlet opening 43a of the air cleaner unit 42 which open towards the left side of the motorcycle body as shown in FIG. 3, and is then substantially purified within the air cleaner unit 42 and the resultant, substantially purified air CA is supplied from the outlet opening 43b to the air control valve unit 46 that is positioned forwardly of the air cleaner unit 42.

The purified air CA supplied to the air control valve unit 46 is, after the amount or flow thereof has been adjusted by the air control valve unit 46 having its valve opening variable in dependence on, for example, the number of revolutions of the combustion engine E, supplied to the supercharger 44 on the left side of the intake duct 60 by way of the intake duct 60 that is disposed forwardly of the air control valve unit 46 shown in FIG. 5. At this time, the purified air CA then flowing forwards is guided by the intake duct 60 so as to flow from the right side towards the left side of the motorcycle body. The purified air CA so supplied to the supercharger 44 is pressurized by the supercharger 44 and is then supplied to the surge tank 48 positioned above the supercharger 44.

The purified air CA supplied to the surge tank 48 in the manner described above is, after having been temporarily reserved within the surge tank 48, supplied to the throttle body 49 best shown in FIG. 4 and is then mixed with fuel injected from the main injectors 78 to thereby form the air/fuel mixture, which is in turn supplied to the cylinder heads 36. Should the load on the combustion engine E be high, the fuel is also injected from the top injectors 68.

In the supercharger system described above, since the supercharger 44 and the air cleaner unit 42 are positioned rearwardly of the cylinder block 34, the both can be disposed in a closely juxtaposed relation to each other and can also be fluidly connected directly with each other. Therefore, the use of any intermediate piping between the air cleaner unit 42 and the supercharger 44 is eliminated to allow the space around the combustion engine E to be saved and the number of component parts required can be reduced to simplify the structure. Also, positioning of the air cleaner unit 42 at a location rearwardly of the cylinder block 34 while the use of any intermediate piping is eliminated as pointed above is effective to secure a relatively large space at a site rearwardly upwardly of the cylinder block 34 and above the supercharger 44 and, therefore, the surge tank 48 and the fuel tank 28, which are disposed there, can have increased tank capacities.

Also, since the air cleaner unit 42 is disposed rearwardly of the supercharger 44, a compact intake system can be realized of a kind which has the shortest possible intake passage capable of sucking from rear of the combustion engine E and leading from the supercharger 44 to the combustion engine E. In addition, since the supercharger 44 is positioned intervening between the air cleaner unit 42 and the combustion engine E, allowing the air cleaner unit 42 to be distant from the combustion engine E, the air substantially free from thermal influences, which would be brought about by heat radiation from the combustion engine E, can be introduced into the air cleaner unit 42, resulting in an increase of the air intake efficiency.

Considering that the air cleaner unit 42 is positioned above the crossbar 1b at an intermediate portion of the motorcycle body with respect to the length of the motorcycle, the air cleaner unit 42 can be disposed within a space available at a site rearwardly above a rear portion of the main frame 1 that extends rearwardly downwardly as shown in FIG. 1 and, therefore, the air cleaner unit 42 can have an increased capacity.

Also, the air A is drawn into the air cleaner unit 42 through the intake opening 43a opening towards the left side of the motorcycle body as shown in FIG. 3, and, after it has been substantially purified by the cleaner element 58 within the air cleaner unit 42, the substantially purified air is introduced from the outlet opening 43b, which opens in a direction rightwards forwardly, into the supercharger 44 through the suction port 44a on the right side as shown in FIG. 5, by way of the air control valve unit 46. In this way, the air A drawn into the air cleaner unit 42 from the left side of the motorcycle body is discharged from the right side of the air cleaner unit 42 and the substantially purified air CA does then flow into the supercharger 44 through the suction port 44a, that opens towards the right side, and, therefore, the air passage extending from the air cleaner unit 42 to the supercharger 44 can extend a reduced distance and as a result, the passage friction loss can be suppressed. Furthermore, since the supercharger 44 is disposed on the left side of the motorcycle body and the air control valve unit 46 is disposed on the right side of the supercharger 44, at least a portion of the air control valve unit 46, when viewed from side, overlaps the supercharger 44. Accordingly, the space available between the cylinder block 34, best shown in FIG. 4, and the air cleaner unit 42 can be efficiently utilized to accommodate the supercharger 44 and the air control valve unit 46 therein and, therefore, the space around the combustion engine E can be further saved.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 ... Main frame
1b ... Crossbar
28 ... Fuel tank
32 ... Crankcase
34 ... Cylinder block
42 ... Air cleaner unit
44 ... Supercharger
46 ... Air control valve unit
48 ... Surge tank
E ... Combustion engine

What is claimed is:

1. A motorcycle which comprises:
   a combustion engine having a cylinder block protruding upwardly from a crankcase and a cylinder head mounted atop the cylinder block;
   an air cleaner unit for substantially purifying an air;
   a supercharger for taking a substantially purified air from the air cleaner unit thereinto and supplying the air towards the combustion engine, the supercharger having a rotary shaft driven by drivingly connecting the rotary shaft with a crankshaft shaft of the combustion engine through a chain or a train of gears
   a surge tank disposed rearwardly upwardly of the cylinder block of the combustion engine and above the supercharger, the surge tank including a tank body, a tank inlet portion extending downwardly from the tank body and an opening formed in the tank body; and
   a throttle body disposed intermediate between the surge tank and the cylinder head, the opening of the tank body being connected with an intake passage of the throttle body;
   in which the supercharger is disposed rearwardly of the cylinder block.

2. The motorcycle as claimed in claim 1, in which the air cleaner unit is disposed rearwardly of the supercharger.

3. The motorcycle as claimed in claim 2, in which the air cleaner unit is disposed above a crossbar in a main frame of a motorcycle body.

4. The motorcycle as claimed in claim 1, further comprising a fuel tank disposed above the combustion engine, the supercharger and the air cleaner unit.

5. The motorcycle as claimed in claim 1, further comprising an air control valve unit for adjusting an amount of the air to be supplied to the supercharger, the air control valve being disposed intermediate between the supercharger and the air cleaner unit.

6. The motorcycle as claimed in claim 5, in which at least a portion of the air control valve unit, when viewed from side, is so disposed as to overlap the supercharger.

7. The motorcycle as claimed in claim 1, in which the air cleaner unit has an intake opening, which opens towards one lateral side of a motorcycle body, and the supercharger has a suction port that is directed towards the opposite lateral side of the motorcycle body; and
   in which the supercharger and the air cleaner unit are fluidly connected directly with each other.

8. The motorcycle as claimed in claim 1, in which the supercharger is positioned above a lower end edge of the cylinder block and is positioned below an upper end edge of the cylinder block.

9. The motorcycle as claimed in claim 1, in which the tank body has a bottom surface confronting the cylinder head.

10. The motorcycle as claimed in claim 9, in which the combustion engine is employed in the form of a parallel multicylinder combustion engine;
    in which the tank body has a width substantially equal to that of a set of the cylinder heads.

11. The motorcycle as claimed in claim 1, in which the combustion engine is employed in the form of a parallel multicylinder combustion engine;
    in which the tank inlet portion is formed at a widthwise intermediate portion of the tank body.

12. The motorcycle as claimed in claim 1, in which the combustion engine is employed in the form of a parallel multicylinder combustion engine;
    in which a plurality of openings of the surge tank are formed, each for one cylinder, so as to be connected with the respective intake passages of the throttle body.

13. The motorcycle as claimed in claim 1, further comprising a top injector provided in the surge tank.

14. The motorcycle as claimed in claim 13, in which the combustion engine is employed in the form of a parallel multicylinder combustion engine, in which the top injector confronts the opening.

15. The motorcycle as claimed in claim 13, in which the combustion engine is employed in the form of a parallel multicylinder combustion engine, further comprising a main injector arranged in the throttle body.

16. A motorcycle which comprises:
    a parallel multicylinder combustion engine having a cylinder block protruding upwardly from a crankcase and cylinder heads mounted atop the cylinder block;
    an air cleaner unit to substantially purify an air;
    a supercharger to take a substantially purified air from the air cleaner unit thereinto and supply the air towards the combustion engine;
    a surge tank disposed rearwardly upwardly of the cylinder block of the combustion engine; and
    a throttle body disposed intermediate between the surge tank and the cylinder heads;
    in which the surge tank includes:
       a tank body of a width substantially equal to that of the cylinder head, the tank body having a bottom surface confronting the cylinder head, the bottom surface being formed with openings arranged in a row extending in the widthwise direction of the tank body; and
       a tank inlet portion extending downwardly from the tank body, the tank inlet portion being formed at a widthwise intermediate portion of the tank body,
    in which a substantially purified air by the air cleaner unit is introduced through the opening into intake passages of the throttle body.

* * * * *